Jan. 30, 1923.
F. M. FULTON.
SIGNALING APPARATUS FOR USE ON AUTOMOBILES AND THE LIKE.
FILED JAN. 31, 1920.
1,443,356
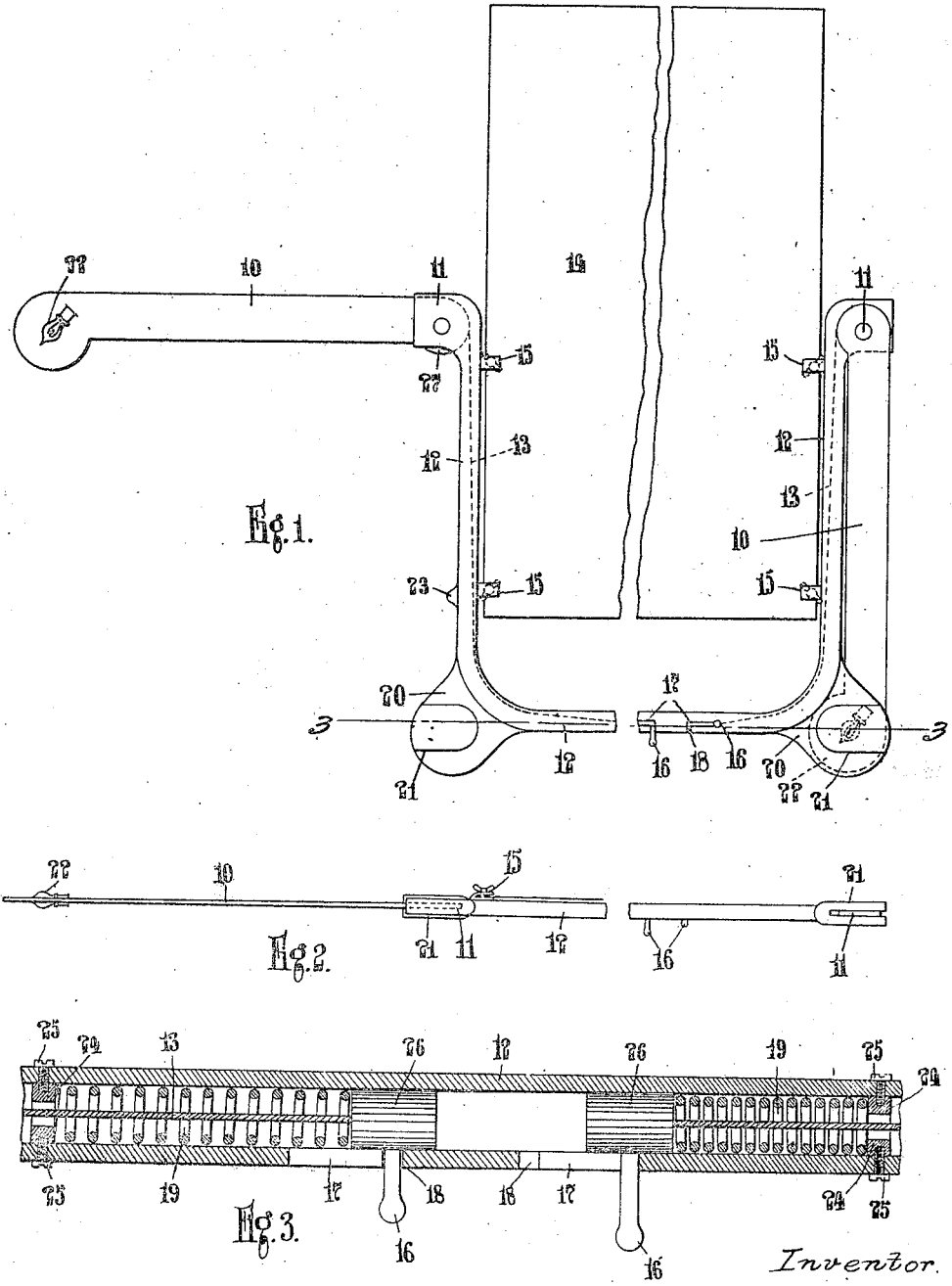
Inventor.
F. M. Fulton
By H. R. Kerslake
Atty Patented Jan. 30, 1923.

1,443,356

UNITED STATES PATENT OFFICE.

FREDERICK MATTHEW FULTON, OF BLOEMFONTEIN, ORANGE FREE STATE, SOUTH AFRICA.

SIGNALING APPARATUS FOR USE ON AUTOMOBILES AND THE LIKE.

Application filed January 31, 1920. Serial No. 355,387.

*To all whom it may concern:*

Be it known that I, FREDERICK MATTHEW FULTON, a subject of the King of Great Britain and Ireland, and residing at 39 Park Road, Bloemfontein, in the Province of the Orange Free State, South Africa, have invented certain new and useful Improvements in Signaling Apparatus for Use on Automobiles and the like, of which the following is a specification.

This invention relates to a signaling apparatus for use on automobiles and the like and has for its object to provide an installation of semaphore signals for the purpose of readily making known the intentions of the driver, that is, for example, whether he intends to stop or to turn to the left or right.

A further object of the invention is to provide an installation of signaling apparatus which is adapted to be controlled by an occupant of the vehicle to give signals not only to adjacent vehicles and the traffic generally but also to the driver of the vehicle.

The present invention consists in signaling apparatus for use on automobiles or other road vehicles, comprising in combination a U-shaped tube, signaling arms pivoted at the ends of the tube, discs mounted on the pivots of the arms, manually operable means slidable in the tube, abutments secured within the tube and spaced from the manually operable means, resilient means interposed between the said manually operable means and said abutments, and flexible connecting means connected at one end to the manually operable means and at the other end coiled round and secured to the discs on the pivots of the arms.

The invention further consists in the combinations and arrangements of parts hereinafter described and claimed.

In the preferred form of the invention a pair of semaphore arms are pivotally mounted, one at each side of the wind screen, on the ends of a metal tube and are adapted to be operated by wires passing through the tube to controls which are operable by the driver or another occupant of the car or both.

Referring now to the accompanying drawings which illustrate one form of apparatus constructed according to the present invention:

Figure 1 is an elevation, and

Figure 2 is a plan of the apparatus with the left hand semaphore in signaling position.

Figure 3 is a section taken on the line 3—3 of Figure 1 on a larger scale.

In the preferred application of the invention to an automobile, the semaphore arms 10 are pivotally connected as at 11 to the ends of a metal tube 12, these pivotal connections being located at each side of the windscreen. The metal tube 12 is substantially of U-shape and the base portion is located below the windscreen so that the driver's view is not obscured thereby. The semaphore arms 10, in their normal or non-signaling position depend vertically from their pivots, and their pivoted ends which preferably are in the form of discs 27 are connected to wires 13 in such a manner that they can be caused to rotate to rise into a horizontal or signaling position. The tube 12 may be attached to the windscreen 14, by clamps 15 which may be of any suitable construction. The other ends of the wire 13 are connected to bolts 26, slidably positioned in the tube 12. These bolts 26 are provided with hand levers 16 which project through slots 17 in the tube near the driver's seat. These slots are provided with recesses 18 in which the levers 16 are adapted to be received and held to maintain the semaphore arms in signaling position.

In order to lessen the effort required to raise the semophore arms, springs 19 may be positioned in the tube and adapted normally to bear against the bolts 26, to tend to cause same to move to raise the semaphore arms. The springs 19 at their other ends bear against a suitable abutment, such as the rings 24 held in position by the set screws 25.

The semaphore arms preferably at their outer ends may be provided with electric glow lamps 22 for use in darkness. These lamps are preferably adapted to show a white light in front and a red light behind. Preferably mounted on the tube 12 are casings 20, the purpose of which is to receive the ends of the semaphore arms and protect the lamps 22 from injury when these arms are in their normal or non-signaling position. This casing may be partly cut away as shown at 21 in order to allow the lamp to show in the inoperative or non-signaling position also. The lamps 22 may be supplied with current, by wires passing through the tube 12, from a battery or other source of current. Clips 23, of any known construction such as spring clips may be provided for the purpose of engaging the semaphore arms in their non-signaling position.

It must however, be understood, that the tube 12 may be of any desired convenient shape and that the controls 17 and the associated parts may be located in any other desired part of the vehicle, so that an occupant may give signals not only to the traffic but also to the driver. Or the controls 16 and the associated parts may be duplicated, a second set of controls being located in an auxiliary loop of tube which may be connected to the tube 12, so that not only can the driver give signals of his intentions to the traffic but the occupant can also give signals to both the driver and the traffic.

In their preferred position, the semaphore arms are visible not only to the traffic generally but also to the drivers of vehicles abreast of or adjacent to the vehicle carrying the signaling apparatus.

The device is used as follows:—

It it is desired to turn to the right, the right hand lever 16 is actuated to cause the right hand semaphore arm to assume its horizontal position; if it is desired to turn to the left, the left hand lever 16 is similarly operated; if it is desired to stop, both signals should be put into horizontal position.

The use of this invention will obviate the necessity of the driver having to put his arm out when turning corners or when halting and will prevent any mistake on the part of the traffic, foot or wheeled, as the arm or arms remain out until they are released by the driver. In wet weather, when the vehicle is enclosed by the hood, the trouble of opening the latter to put the arm out is avoided.

The device saves the driver trouble, and is a convenience to the traffic. Accidents due to the human arm signal not being correctly made or seen, are prevented, and the constables on point-duty will be saved infinite trouble as they will be able to see distinctly in which direction the driver desires to go, and thus will not be dependent on the driver's arm, which is only out sometimes for a second and is not always noticed.

Having now described my invention, what I claim as new and desire to secure by Letters Patent is:—

1. Signaling apparatus for use on automobiles or other road vehicles, comprising in combination a U-shaped tube, signaling arms pivoted at the ends of the tube, discs mounted on the pivots of the arms, manually operable means slidable in the tube, abutments secured within the tube and spaced from the manually operable means, resilient means interposed between the said means and said abutments, and flexible connecting means connected at one end to the manually operable means and at the other end coiled round and secured to the discs on the pivots of the arms.

2. Signaling apparatus for use on automobiles or other road vehicles, comprising in combination a U-shaped tube, signaling arms pivoted at the ends of the tube, discs mounted on the pivots of the arms, manually operable means slidable in the tube, abutments secured within the tube and spaced from the manually operable means, resilient means interposed between the said means and said abutments, flexible connecting means connected at one end to the manually operable means and at the other end coiled round and secured to the discs on the pivots of the arms, illuminating means carried by the free ends of the signaling arms and casings carried by the tube and adapted to receive and protect illuminating means when the arms are in their non-signaling positions.

In testimony whereof I have signed my name to this specification.

FREDERICK MATTHEW FULTON.